US 6,677,746 B2

(12) United States Patent
Kim

(10) Patent No.: US 6,677,746 B2
(45) Date of Patent: Jan. 13, 2004

(54) WHEEL SPEED SENSOR FOR A VEHICLE WHICH HAS A FUNCTION OF PREVENTING A COIL OPEN CIRCUIT

(75) Inventor: Young-Hwan Kim, Incheon (KR)

(73) Assignee: VDO Halla Korea Ltd., Chungchongbuk-do (KR)

(*) Notice: Subject to any disclaimer, the term of this patent is extended or adjusted under 35 U.S.C. 154(b) by 184 days.

(21) Appl. No.: 10/010,220

(22) Filed: Dec. 7, 2001

(65) Prior Publication Data

US 2002/0079886 A1 Jun. 27, 2002

(30) Foreign Application Priority Data

Dec. 27, 2000 (KR) .................................. 2000-0036591 U

(51) Int. Cl.[7] ................................................. G01P 3/48
(52) U.S. Cl. .................. 324/174; 324/207.15; 174/52.2
(58) Field of Search ................................. 324/174, 173, 324/207.15, 207.16; 174/52.2; 29/595, 602.1

(56) References Cited

U.S. PATENT DOCUMENTS

| 4,652,818 A | 3/1987 | Buchschmid et al. |
| 5,039,942 A | 8/1991 | Buchschmid et al. |
| 5,254,807 A | 10/1993 | Pfander et al. |
| 5,493,217 A | 2/1996 | Stahl et al. |

*Primary Examiner*—Walter E. Snow
(74) *Attorney, Agent, or Firm*—Harness, Dickey & Pierce, P.L.C.

(57) ABSTRACT

Disclosed is a wheel speed sensor for a vehicle which has a function of detecting revolution of the wheel in order to provide a uniform braking power when a vehicle brakes. The wheel speed sensor is installed at a position adjacent to a sensor rotor of a hub in the vehicle. Guiding bosses protrude from an outer periphery surface of the bobbin in the radial direction. An injected and molded housing encloses the bobbin and the first lead frame, the second lead frame and the third frame. The rubber ring is fitted into the inserting groove to cause close contact with the inner side of the housing. From this structure, the wheel speed sensor can prevent a coil open circuit and has an enhanced durability.

2 Claims, 5 Drawing Sheets

WHEEL SPEED SENSOR FOR A VEHICLE WHICH HAS A FUNCTION OF PREVENTING A COIL OPEN CIRCUIT

BACKGROUND OF THE INVENTION

1. Field of the Invention

The present invention relates to a wheel speed sensor for a vehicle which has a function of preventing a coil open circuit.

2. Description of the Related Art

Generally, a wheel speed sensor is installed at a position adjacent to a sensor rotor of a hub in a vehicle. When a vehicle brakes, the wheel speed sensor detects revolutions of the wheel and outputs a signal indicating the detected revolution of the wheel. This signal is applied to a control unit and then the control unit provides uniform braking power on the basis of the signal.

Various techniques for the wheel speed sensor of a vehicle have been proposed. One approach, an electrical measuring instrument with connecting cable, has been proposed on U.S. Pat. No. 4,652,818 issued to Emil Buchschmid on May 24, 1987. Since this electrical measuring instrument is constituted of two housings, a bonding agent in order to assemble the housings together must be used. Consequently, the durability of the electrical measuring instrument deteriorates.

Next, U.S. Pat. No. 5,039,942 issued to Emil Buchschmid on Aug. 13, 1991 discloses a cable supporting insert for closing an opening in the housing of an inductive rotational speed sensor. However, in this cable supporting insert, a coil may be broke owing to minute movement of a permanent magnet during the manufacturing process of the housings by using an injecting molding technique.

Also, U.S. Pat. No. 5,254,807 issued to Werner Pfander on Oct. 19, 1993 discloses a sensor,. in particular RPM sensor. Since the sensor is constituted of two housings, a bonding agent in order to assemble the housings together must be used. Consequently, the durability of the sensor deteriorates.

Meanwhile, U.S. Pat. No. 5,493,217 issued to Ulrich Stahi on Feb. 24, 1996 discloses a longer-lasting inductive sensor with an electrical coil, having improved load-bearing and thermal properties. However, the coil of this inductive sensor may easily break when a conductive area having a wound coil is folded up.

SUMMARY OF THE INVENTION

The present invention solves the foregoing problems. It is an object of the present invention to provide a wheel speed sensor for a vehicle which has a function of preventing a coil open circuit.

It is another object of the present invention to provide a wheel speed sensor for a vehicle capable of having enhanced durability.

In order to achieve the above objects, the present invention provides a wheel speed sensor for a vehicle which has a function of preventing a coil open circuit, the wheel speed sensor comprising:

a bobbin having a coil winding part which is formed at a one end of the bobbin to become one body with the bobbin, a flange which is formed at a front portion of the coil winding part to become one body with the coil winding part, a guiding protrusion protruding from an upper portion of the coil winding part, and guiding bosses outwardly protruding from an outer periphery surface of the bobbin in the radial direction so that the coil directly passes by the guiding bosses, in which an inserting groove is formed along a circumference of the flange;

a lead frame member having a first lead frame, a second lead frame and a third lead frame, which are longitudinally arranged on the outer periphery surface of the bobbin, wherein the third lead frame protrudes from one side surface of the first lead frame, one end of the second lead frame is fixed to the surface of the bobbin and the other end of the second lead frame is perpendicular to the surface of the bobbin, the coil is wound around the other end of the second lead frame, the other end of the second lead frame is folded toward the third lead frame, and one end of the third lead frame is folded toward the second lead frame in order to press the second lead frame; and an injected, molded housing member for enclosing the bobbin and the lead frame member, whereby the coil becomes relaxed when the second lead frame is folded toward the third lead frame.

A rubber ring is fitted into the inserting groove to cause close contact with the inner side of the housing.

As described above, in a wheel speed sensor for a vehicle which has a function of preventing a coil open circuit according to the preferred embodiment of the present invention, guiding bosses outwardly protrude from the outer periphery surface of the bobbin in the radial direction so that the coil may be directly passed by the guiding boss. Further, a housing encloses the first lead frame, the second lead frame and the third lead frame. In addition, a rubber ring is fitted into the inserting groove to cause contact with the inner side of the housing. With this structure, the wheel speed sensor can prevent a coil open circuit with the aid of the guiding boss.

BRIEF DESCRIPTION OF THE DRAWINGS

The above objects and other characteristics and advantages of the present invention will become more apparent by describing in detail preferred embodiments thereof with reference to the attached drawings, in which.

DETAILED DESCRIPTION OF THE PREFERRED EMBODIMENTS

Hereinafter, a wheel speed sensor for a vehicle which has a function of preventing a coil open circuit according to a preferred embodiment of the present invention will be explained in more detail with reference to the accompanying drawings.

Figure 1:
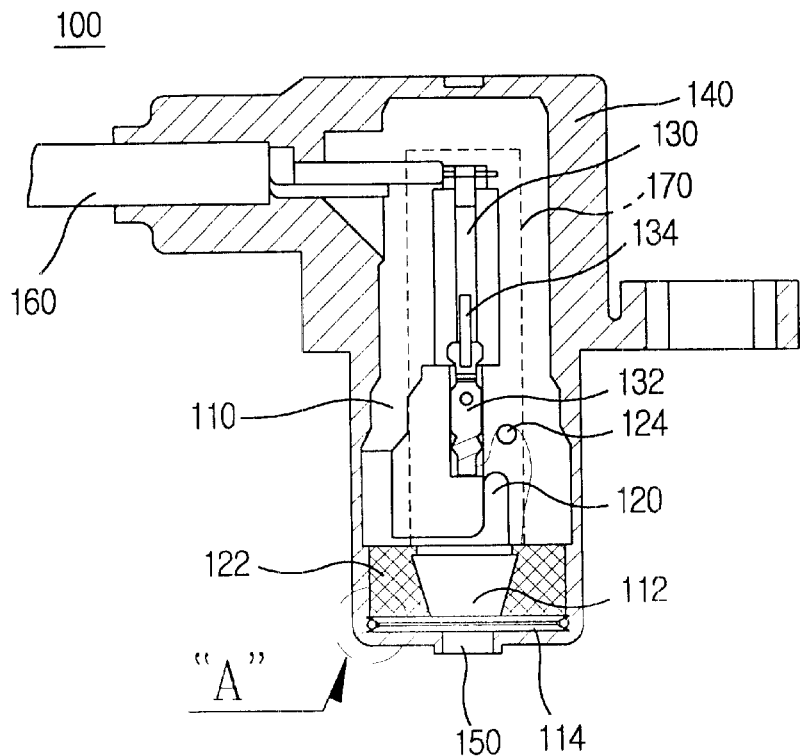
FIG. 1 is a sectional view of a wheel speed sensor for a vehicle which has a function of preventing a coil open circuit according to the preferred embodiment of the present invention.
Figure 2:
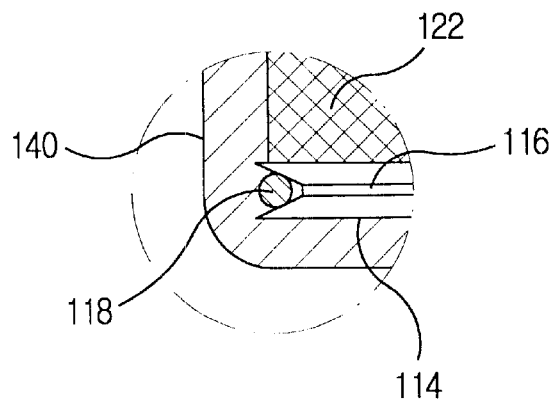
FIG. 2 is an enlarged view of section "A" illustrated in FIG. 1.

Referring to FIGS. 1 and 2, a wheel speed sensor 100 according to the preferred embodiment of the present invention mainly includes a bobbin 110 and an injected, molded housing 140 for enclosing the housing 140.

A coil winding part 112 is formed at one end of the bobbin 110 to become one body with the bobbin 110. The coil 122 is wound around the outer periphery surface of the coil winding part 112. A flange 114 is formed at a front portion of the coil winding part 112 to become one body with the coil winding part 112. A guiding protrusion 120 protrudes from an upper portion of the coil winding part 112. A guiding boss 124 protrude from an outer periphery surface of the bobbin 110 in the radial direction so that the coil 122 directly passes by the guiding boss 124. Preferably, at least two guiding protrusions 120 and two guiding bosses 124 are formed at the outer periphery surface of the bobbin 110.

A permanent magnet 170 is longitudinally disposed in the bobbin 110. One end of the permanent magnet 170 is connected to the connecting cable 160 and the other end of the permanent magnet 170 is exposed to an outer portion of the bobbin 110. A pole shoe 150 is connected to the other end of the permanent magnet 170. The pole shoe 150 passes through an inner portion of the flange 114, and one end of the pole shoe 150 is exposed to the outside of the bobbin 110.

An inserting groove 116 is formed along a circumference of the flange 114. A rubber ring 118 is fitted into the inserting groove 116 to cause contact with the inner side of the housing 140.

Figure 3:
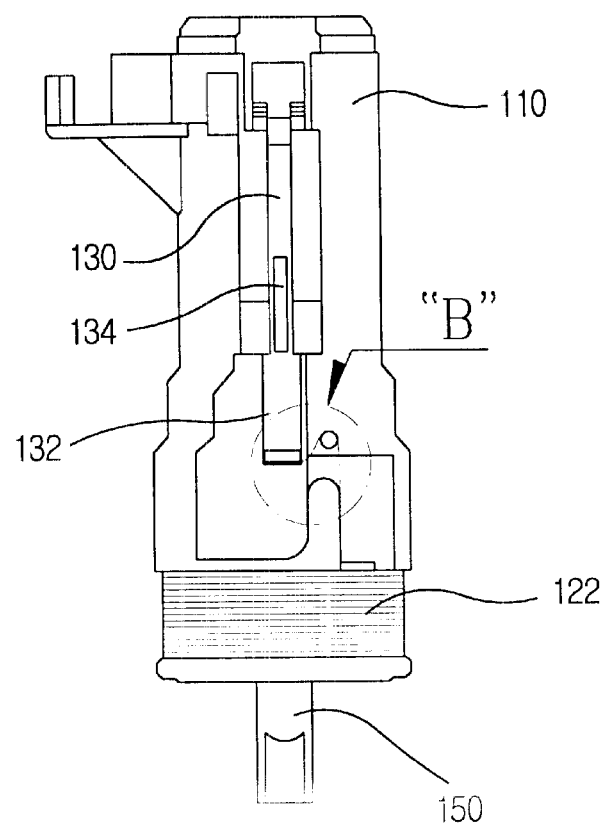
FIG. 3 is a front view of a bobbin showing a state that the first lead frame and the second lead frame are not folded.
Figure 4:
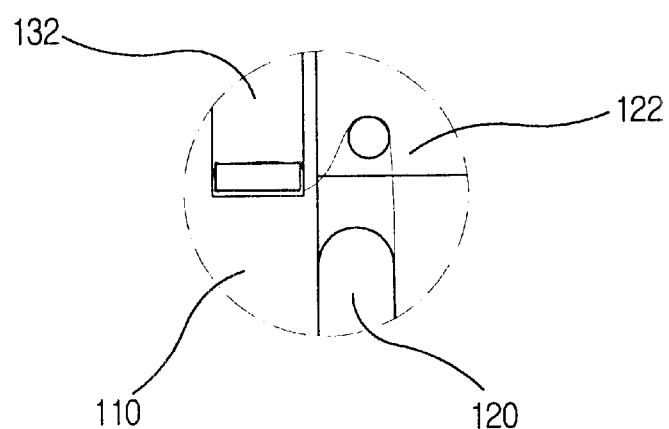
FIG. 4 is a rear view of a bobbin showing a state that the first lead frame and the second lead frame are not folded.
Figure 5:
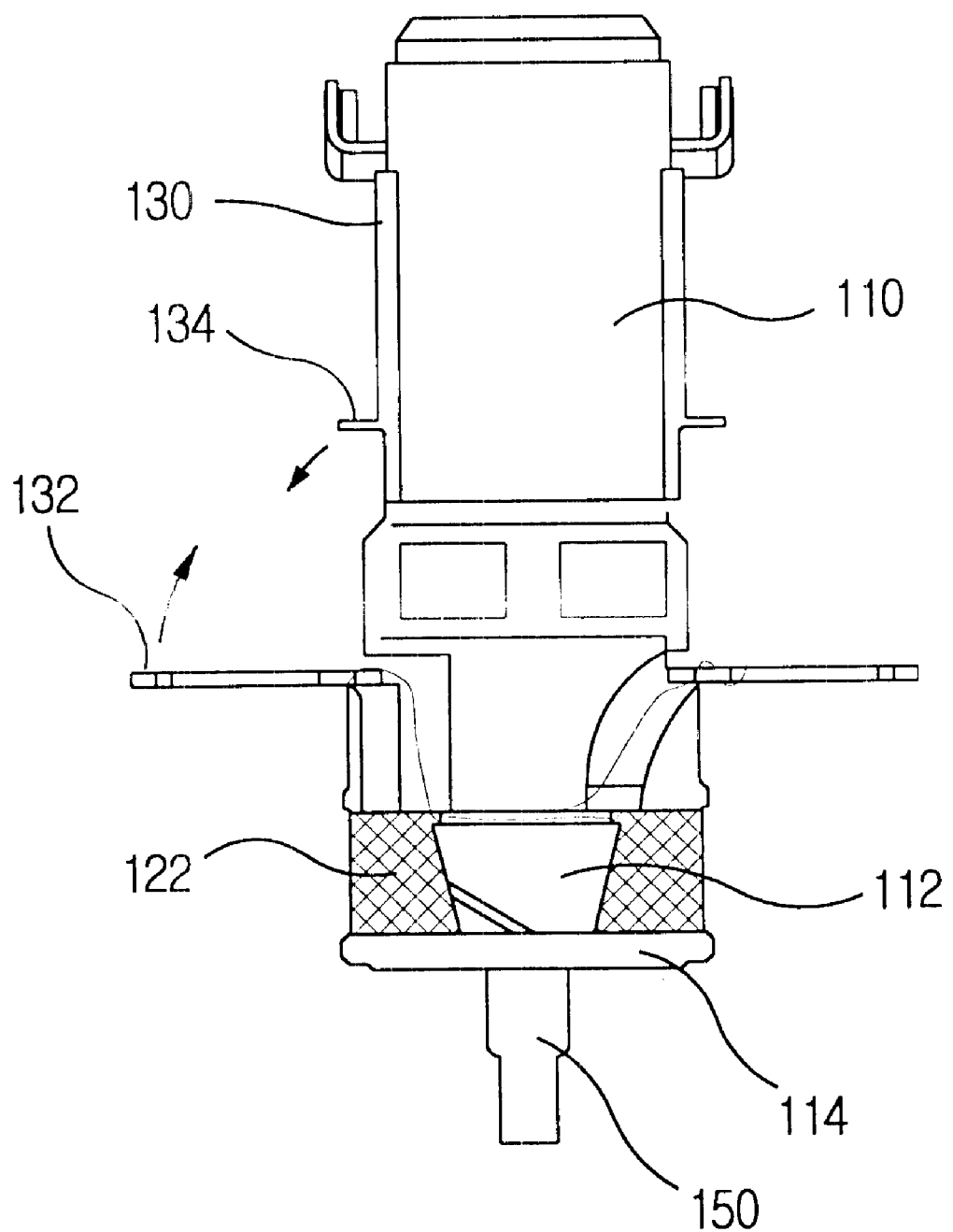
FIG. 5 is an enlarged view of section "B" illustrated in FIG. 3.

Referring to FIGS. 3 to 5, the first lead frame 130, the second lead frame 132 and the third frame 134 are longitudinally arranged on the outer periphery surface of the bobbin 110. The first lead frame 130, the second lead frame 132 and the third frame 134 are made of a metallic material. One end of the second frame 132 is fixed to the surface of the bobbin 110, and the other end of the second lead frame 132 is perpendicular to the surface of the bobbin 110. The third lead frame 134 protrudes from one side surface of the first lead frame 130. The coil 122 is wound around the other end of the second lead frame 132. The coil 122 directly passes by the guiding boss 124 under tension.(refer to FIG. 4)

Figure 6:
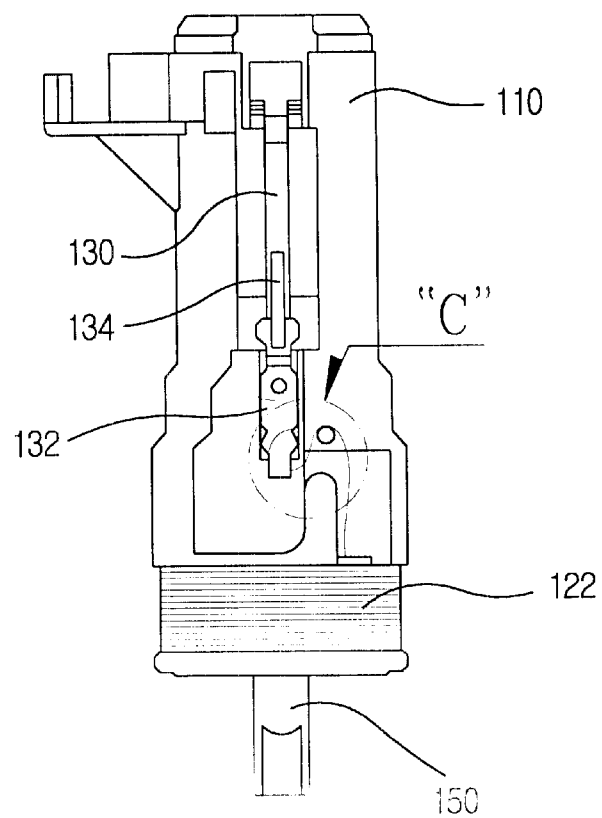
FIG. 6 is a front view of a bobbin showing a state that the first lead frame and the second lead frame are folded.
Figure 7:
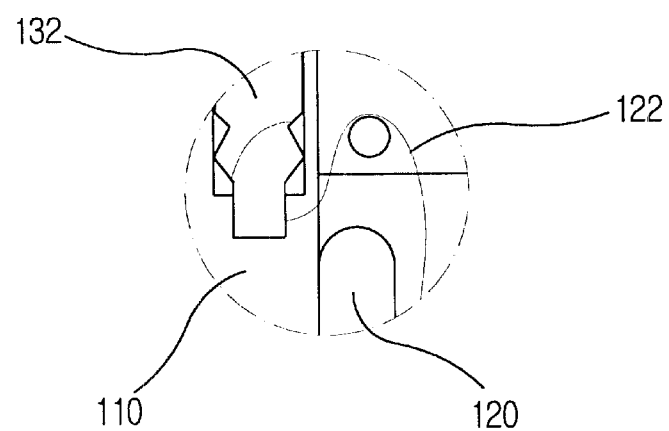
FIG. 7 is a rear view of a bobbin showing a state that the first lead frame and the second lead frame are folded and coupled with each other.
Figure 8:
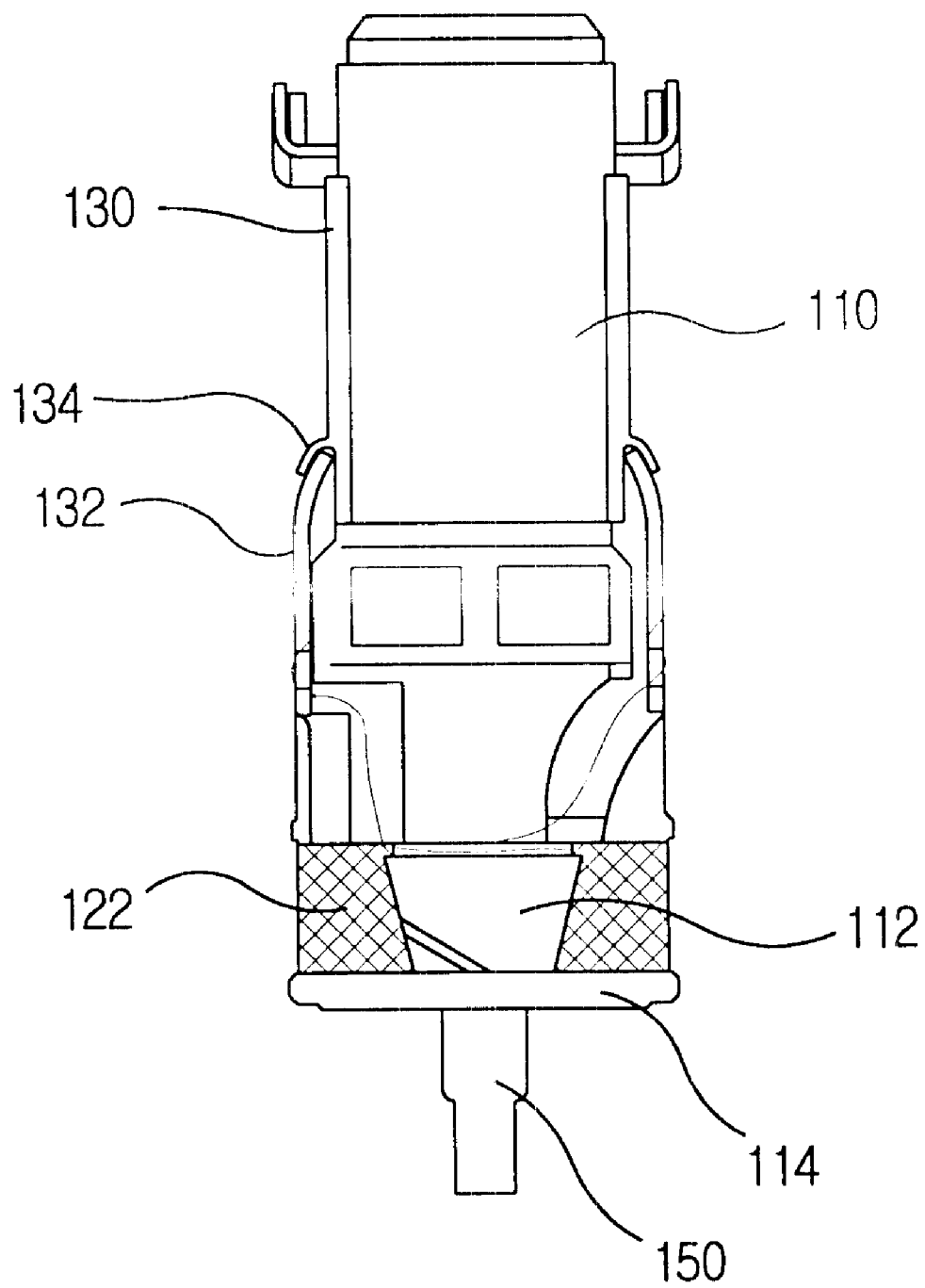
FIG. 8 is an enlarged view of section "C" illustrated in FIG. 6.

Referring to FIGS. 6 to 8, the other end of the second lead frame 132 is folded toward the third lead frame 134, and the one end of the third lead frame 134 is folded toward the second lead frame 132 in order to press the second lead frame 132. At this time, the second lead frame 132 is moved to the guiding boss 124, and then the coil 122 winding the second lead frame 132 changes over from a state of tension to being relaxed.(refer to FIG. 7)

Referring now to FIG. 1, the injected, molded housing 140 encloses the bobbin 110, the first lead frame 130, the second lead frame 132 and the third frame 134. Also, a rubber ring 118 is fitted into the inserting groove 116 to cause contact with the inner side of the housing 140. The rubber ring 118 fixedly contacts the bobbin 110 and the housing 140 with each other.

As described above, in the wheel speed sensor for a vehicle according to the preferred embodiment of the present invention, at least two guiding protrusions 120 and two guiding bosses 124 are formed at the outer periphery surface of the bobbin 110. From this structure, it is possible to prevent a coil 122 from breaking when the second lead frame 132 is folded toward the third lead frame 134. Since the rubber ring 118 is fitted into the inserting groove 116 to close contact with the inner side of the housing 140, the durability of the wheel speed sensor is highly enhanced.

Although various embodiments which incorporate the teachings of the present invention have been shown and described in detail herein, those skilled in the art can readily devise many other varied embodiments that still incorporate these teachings.

What is claimed is:

1. A wheel speed sensor for a vehicle which has a function of preventing a coil open circuit, the wheel speed sensor comprising:

a bobbin having a coil winding part which is formed at a one end of the bobbin to become one body with the bobbin, a flange which is formed at a front portion of the coil winding part to become one body with the coil winding part, a guiding protrusion protruding from an upper portion of the coil winding part, and guiding bosses outwardly protruding from an outer periphery surface of the bobbin in the radial direction so that the coil directly passes by the guiding bosses, in which an inserting groove is formed along a circumference of the flange;

a lead frame member having a first lead frame, a second lead frame and a third lead frame, which are longitudinally arranged on the outer periphery surface of the bobbin, wherein the third lead frame protrudes from one side surface of the first lead frame, one end of the second lead frame is fixed to the surface of the bobbin and the other end of the second lead frame is perpendicular to the surface of the bobbin, the coil is wound around the other end of the second lead frame, the other end of the second lead frame is folded toward the third lead frame, and one end of the third lead frame is folded toward the second lead frame in order to press the second lead frame; and an injected and molded housing member for enclosing the bobbin and the lead frame member, whereby the coil becomes relaxed when the second lead frame is folded toward the third lead frame.

2. A wheel speed sensor as claimed in claim 1, wherein a rubber ring is fitted into the inserting groove to cause close contact with the inner side of the housing.

* * * * *